US012671223B2

(12) United States Patent　(10) Patent No.:　US 12,671,223 B2
Xu et al.　(45) Date of Patent:　Jun. 30, 2026

(54) LASER APPARATUS AND METHOD

(71) Applicant: McMaster University, Hamilton (CA)

(72) Inventors: Chang-Qing Xu, Dundas (CA); Liam Flannigan, Hamilton (CA); Joshua Kneller, Hamilton (CA)

(73) Assignee: McMaster University, Hamilton (CA)

( * ) Notice: Subject to any disclaimer, the term of this patent is extended or adjusted under 35 U.S.C. 154(b) by 851 days.

(21) Appl. No.: 17/971,042

(22) Filed: Oct. 21, 2022

(65) Prior Publication Data

US 2023/0128226 A1　Apr. 27, 2023

Related U.S. Application Data

(60) Provisional application No. 63/262,904, filed on Oct. 22, 2021.

(51) Int. Cl.
*H01S 3/00*　(2006.01)
*G02F 1/35*　(2006.01)
*H01S 3/0941*　(2006.01)
*H01S 3/108*　(2006.01)
*H01S 3/109*　(2006.01)

(52) U.S. Cl.
CPC ............ *H01S 3/0092* (2013.01); *G02F 1/353* (2013.01); *H01S 3/09415* (2013.01); *H01S 3/1083* (2013.01); *H01S 3/109* (2013.01)

(58) Field of Classification Search
CPC ............. H01S 3/0092; H01S 3/094038; H01S 3/09415; H01S 3/109; H01S 3/1083; G02F 1/353
See application file for complete search history.

(56) References Cited

U.S. PATENT DOCUMENTS 5,657,119 A　8/1997　Kawasaki et al.
5,796,513 A　8/1998　Stamm et al.
(Continued)

FOREIGN PATENT DOCUMENTS

CN　201549762 U　*　8/2010
CN　105449510 A　*　3/2016　........... H01S 3/1083
(Continued)

OTHER PUBLICATIONS

Du, Zhenhui, et al. "Mid-Infrared Tunable Laser-Based Broadband Fingerprint Absorption Spectroscopy for Trace Gas Sensing: A Review." Applied Sciences, vol. 9, No. 2, 2019.
Mohammad Ali Khalighi, Murat Uysal. "Survey on Free Space Optical Communication: A Communication Theory Perspective." IEEE Communications Surveys & Tutorials. vol. 16, No. 4. 2014.
Giacomo Insero et al. "Difference frequency generation in the mid-infrared with orientation-patterned gallium phosphide crystals." Optics Letters, vol. 41, No. 21, pp. 5114-5117, 2016.
(Continued)

*Primary Examiner* — James A Menefee
(74) *Attorney, Agent, or Firm* — SMART & BIGGAR LP; Stephen Beney; Ryan De Vries

(57) ABSTRACT

A narrow linewidth mid infrared laser, including a pumping laser diode with a fast-axis compressor and a pumping wavelength $\lambda_o$; and an optical resonator arranged to receive the pumping wavelength $\lambda_o$, the optical resonator including a laser crystal with a lasing wavelength $\lambda_p$, a dichroic mirror, and a nonlinear crystal to generate an idler wavelength $\lambda_i$.

24 Claims, 8 Drawing Sheets

(56) References Cited

U.S. PATENT DOCUMENTS

| | | | | |
|---|---|---|---|---|
| 6,295,160 | B1 * | 9/2001 | Zhang | G02F 1/39 |
| | | | | 359/330 |
| 8,867,584 | B2 | 10/2014 | Dunn et al. | |
| 8,970,944 | B2 | 3/2015 | Chuu et al. | |
| 9,086,609 | B1 | 7/2015 | Yan et al. | |
| 9,438,011 | B2 | 9/2016 | Frez et al. | |
| 10,725,359 | B2 | 7/2020 | Nawata et al. | |
| 11,221,271 | B2 * | 1/2022 | Stothard | G02F 1/39 |
| 2002/0191664 | A1 * | 12/2002 | Trussell, Jr. | H01S 3/09415 |
| | | | | 372/71 |
| 2009/0141281 | A1 * | 6/2009 | Stothard | H01S 3/1083 |
| | | | | 372/21 |
| 2009/0257463 | A1 * | 10/2009 | Kusukame | H01S 3/109 |
| | | | | 372/22 |
| 2011/0064096 | A1 * | 3/2011 | Shah | G02F 1/39 |
| | | | | 372/6 |
| 2012/0011342 | A1 | 1/2012 | Ingle et al. | |
| 2016/0111848 | A1 * | 4/2016 | Hellström | H01S 3/1317 |
| | | | | 372/20 |
| 2018/0101085 | A1 * | 4/2018 | Tekavec | G02F 1/39 |

FOREIGN PATENT DOCUMENTS

| | | | | | |
|---|---|---|---|---|---|
| CN | 106992426 | A | * 7/2017 | | H01S 3/1083 |
| FR | 2743904 | A1 | * 7/1997 | | G02F 1/39 |

OTHER PUBLICATIONS

Kosterev et al., "Application of quantum cascade lasers to trace gas analysis," Appl. Phys. B. vol. 90, pp. 165-176, 2008.

Canalias, C., Pasiskevicius, V. "Mirrorless optical parametric oscillator". Nature Photon 1, 459-462 (2007).

Citlali E. Minor and Roger S. Cudney. "Mirrorless optical parametric oscillation in bulk PPLN and PPLT: a feasibility study". Appl. Phys. B. 2017.

Y F Peng et al. "A high-power narrow-linewidth optical parametric oscillator based on PPMgLN". Laser Phys. 23, 2013.

Sheng, Quan, et al. "Continuous-Wave Mid-Infrared Intra-Cavity Singly Resonant PPLN-OPO Under 880 Nm In-Band Pumping." Optics Express, vol. 20, No. 7, p. 8041., 2012.

* cited by examiner

Pump Laser

$\lambda o$

Laser Crystal

$\lambda p$

Nonlinear Crystal

$\lambda s$ $\lambda i$ 30     32     34     36

Fig.6

Output Wavelength

Fig.9

LASER APPARATUS AND METHOD

FIELD

The specification relates generally to optics, and, specifically, to nonlinear optics, nonlinear materials and lasers.

BACKGROUND

Light generation in the mid wave infrared and long wave infrared wavelength ranges is important for many fields including gas sensing, free space communication and LiDAR (see, e.g., Du, Zhenhui, et al. "Mid-Infrared Tunable Laser-Based Broadband Fingerprint Absorption Spectroscopy for Trace Gas Sensing: A Review." *Applied Sciences*, vol. 9, no. 2, 2019).

For example, many gasses have their fundamental absorption band in the mid infrared wavelength or long wave infrared range, leading to this being a useful range to perform gas sensing where the absorption coefficient is much larger than that of the short-wave infrared. The mid wave and long wave infrared regions have several windows where atmospheric absorption is negligible, allowing for light to be transmitted and received over much longer distances than would be obtainable using standard short wave infrared wavelengths widely used in the telecom industry (see, e.g., Mohammad Ali Khalighi, Murat Uysal. "Survey on Free Space Optical Communication: A Communication Theory Perspective." *IEEE Communications Surveys & Tutorials*. Vol. 16, no. 4. 2014). This makes mid infrared and long wave infrared light useful for applications such as LiDAR and free-space optical communication, where atmospheric effects can significantly degrade device performance.

A common instrument used to measure greenhouse gas (GHG) is based on laser technology. Whether the measurement method used is LiDAR or gas spectroscopy, high quality lasers capable of meeting various performance requirements are needed. Due to the rise of optics within the telecom industry, lasers which can emit in the short wavelength infrared (SWIR) are able to achieve high performance while being cost effective. However, many of the GHGs of interest for monitoring, including methane and nitrous oxide have their fundamental absorption band in the mid wave infrared (MWIR) wavelength range, which makes laser sources capable of emitting in the MWIR ideal for detecting these gasses. As a result, there is strong demand for cost effective MWIR laser sources that can achieve high performance specifications including high output power, narrow emission wavelength and tunability.

Currently two types of lasers are generally used for gas spectroscopy: interband cascade lasers (ICLs) for the 3-4 micron range and quantum cascade lasers (QCLs) for the 7-11 micron range (see, e.g., United States Patent Application Pub. No. 2012/0113426 A1; Giacomo Insero et al. "Difference frequency generation in the mid-infrared with orientation-patterned gallium phosphide crystals." *Optics Letters*, vol. 41, no. 21, pp. 5114-5117, 2016; Kosterev et al., "Application of quantum cascade lasers to trace gas analysis," *Appl. Phys.* B. vol. 90, pp. 165-176, 2008). In terms of the ICL, the output power is typically very low, on the orders of mW (see e.g., U.S. Pat. No. 9,438,011 B2; Giacomo Insero et al. "Difference frequency generation in the mid-infrared with orientation-patterned gallium phosphide crystals." *Optics Letters*, vol. 41, no. 21, pp. 5114-5117, 2016). Furthermore, ICLs are cost prohibitive to many applications due to the complicated semiconductor manufacturing processes required to make them. Quantum cascade lasers have recently been demonstrated with emission wavelengths in the 3-micron range but have yet to become commercially available. As a result, there is no commercially available laser which can achieve high power, narrow emission linewidth, low cost with a 3-4 micron center emission wavelength.

Optical parametric oscillators are a type of laser that can be used for the generation of mid wave infrared light. While the cost of optical parametric oscillators is much lower than other mid wave infrared lasers such as ICLs and QCLs they suffer from requiring many additional optical components to create the required cavities. Furthermore, they have much larger emission spectrums, reducing their effectiveness in applications such as spectroscopy. While narrow linewidths have been achieved with optical parametric oscillators, they require the use of wavelength selective elements which reduce the output power. As a result, pulsed operation is commonly used to increase output power; however, many spectroscopy techniques such as wavelength modulation spectroscopy require continuous wave sources and rapid scan of the output wavelength, preventing pulsed optical parametric oscillators from being used.

Backwards optical parametric oscillators represent another device that can be used to generate narrow emission linewidth MWIR light. Theoretical analysis of backwards optical parametric oscillators show that emission linewidths can be tens of picometers (see, e.g., Canalias, C., Pasiskevicius, V. "Mirrorless optical parametric oscillator". *Nature Photon* 1, 459-462 (2007)). However, for technical reasons, they have had limited implementation with conventional nonlinear materials.

Of the demonstrated devices, operation has been achieved using select materials which are able to be poled in small enough regions or through complex alignment of the poling structure and pump beam (see, e.g., Citlali E. Minor and Roger S. Cudney. "Mirrorless optical parametric oscillation in bulk PPLN and PPLT: a feasibility study". *Appl. Phys*. B. 2017.). Other theoretical investigations have shown the possibility of achieving backwards optical parametric oscillation in periodically poled lithium niobate, but this requires the use of higher order quasi phase matching, resulting in a drastic decrease in device efficiency and would likely be limited to pulsed operation (see, e.g., Citlali E. Minor and Roger S. Cudney. "Mirrorless optical parametric oscillation in bulk PPLN and PPLT: a feasibility study". *Appl. Phys*. B. 2017.). Mirrorless oscillation has been demonstrated in waveguides in four wave mixing processes (see, e.g., U.S. Pat. No. 9,086,609 B1), and in terahertz wave generation (see, e.g., U.S. Pat. No. 10,725,359 B2) in PPLN using an angled poling period relative to the pump laser allowing for the use of much larger poling periods. The use of backwards optical parametric generation for use in biphoton generation has also been proposed (see, e.g., U.S. Pat. No. 8,970,944 B2) and theoretically examined but not realized due to difficulties in achieving the small poling sizes required.

There have been a number of reported optical parametric oscillator sources, with mid wave infrared emission, for use in spectroscopy. Devices have been reported capable of achieving sub nm emission linewidths (see, e.g., U.S. Pat. No. 5,657,119 A), which is comparable to many gas absorption spectrum linewidths in the mid wave infrared range. However, this was achieved by using a complex setup which requires precise alignment in order to function optimally, increasing the risk of misalignment happening during installation or use, preventing the device from being an ideal candidate (see, e.g., Y F Peng et al. "A high-power narrow-linewidth optical parametric oscillator based on PPMgLN". *Laser Phys.* 23, 2013; Sheng, Quan, et al. "Continuous-Wave Mid-Infrared Intra-Cavity SINGLY Resonant PPLN-OPO Under 880 Nm IN-BAND PUMPING." *Optics Express*, vol. 20, no. 7, p. 8041., 2012; Giacomo Insero et al. "Difference frequency generation in the mid-infrared with orientation-patterned gallium phosphide crystals." *Optics Letters*, vol. 41, no. 21, pp. 5114-5117, 2016). Other systems have been developed (see, e.g., U.S. Pat. No. 5,796,513 A) that achieve narrow emission linewidths without complex structures but require the use of a seed laser in addition to the pump laser. High, continuous wave, output powers can be achieved through the use a dual intracavity optical parametric oscillator (see, e.g., U.S. Pat. No. 8,867,584 B2), potentially watt level with the right pump source and coatings.

There is a need for cost-effective methods to generate MWIR and/or LWIR coherent sources with simple structure, small size, high efficiency, narrow linewidth and potentially high speed modulation capability.

SUMMARY

The following summary is intended to introduce the reader to various aspects of the applicant's teaching, but not to define any invention.

According to some aspects, there is provided a narrow linewidth mid infrared laser, comprising a pumping laser diode with a fast-axis compressor and a pumping wavelength $\lambda o$; and an optical resonator arranged to receive the pumping wavelength $\lambda o$, the optical resonator including a laser crystal with a lasing wavelength $\lambda p$, a dichroic mirror, and a nonlinear crystal to generate an idler wavelength $\lambda i$.

In some examples, an input facet of the laser crystal is coated with a first coating that is a high transmission coating at the lasing wavelength $\lambda o$ and a high reflective coating at the pumping wavelength $\lambda p$; and an output facet of the laser crystal is coated with a second coating that is an anti-reflective coating at the pumping wavelength $\lambda p$.

In some examples, the dichroic mirror is selected to have a nearly zero loss at the pumping wavelength $\lambda p$ and a high reflection at the idler wavelength $\lambda i$.

In some examples, the nonlinear crystal is an orientation patterned semiconductor for backward optical parametric oscillation.

In some examples, the nonlinear crystal includes an input facet coated with a third coating that is an anti-reflective coating at the lasing wavelength $\lambda p$ and a high transmittance coating at the idler wavelength $\lambda i$; and an output facet coated with a fourth coating that is a high reflective coating at the lasing wavelength $\lambda p$.

According to some aspects, there is provided a narrow linewidth mid infrared laser, comprising a pumping laser diode with a fast-axis compressor and a pumping wavelength $\lambda o$; and an optical resonator arranged to receive the pumping wavelength $\lambda o$, the optical resonator including a laser crystal with a lasing wavelength $\lambda p$, and a nonlinear crystal to generate an idler wavelength $\lambda i$; and an optical filter arranged to receive the idler wavelength $\lambda i$ from an outlet facet of the nonlinear crystal. The optical resonator may confine the pumping wavelength $\lambda p$.

In some examples, an input facet of the laser crystal is coated with a first coating that is a high transmission coating at the lasing wavelength $\lambda o$ and a high reflective coating at the pumping wavelength $\lambda p$; and an output facet of the laser crystal is coated with a second coating that is an anti-reflective coating at the pumping wavelength $\lambda p$.

In some examples, the nonlinear crystal is an orientation patterned semiconductor for backward optical parametric oscillation In some examples, the nonlinear crystal includes an input facet coated with a third coating that is an anti-reflective coating at the lasing wavelength $\lambda p$ and a high transmittance coating at the idler wavelength $\lambda i$; and an output facet coated with a fourth coating that is a high reflective coating at the lasing wavelength $\lambda p$ and an anti-reflective or high transmittance coating at the idler wavelength $\lambda i$.

In some examples, the optical filter has nearly zero loss at the idler wavelength $\lambda i$ and high rejection at the lasing wavelength $\lambda p$ and a signal wavelength $\lambda s$ that is also generated by the nonlinear crystal.

According to some aspects, there is provided a high power mid infrared laser, comprising: a pumping laser diode with a fast-axis compressor and a pumping wavelength $\lambda o$; and a first optical resonator arranged to receive the pumping wavelength $\lambda o$, the first optical resonator including a laser crystal with a lasing wavelength $\lambda p$, a dichroic mirror, and a nonlinear crystal to generate an idler wavelength $\lambda i$ and a signal wavelength $\lambda s$; and a second optical resonator arranged to confine the signal wavelength $\lambda s$, the second optical resonator including a mirror, a narrow bandwidth optical filter, the dichroic mirror, and the nonlinear crystal. The first optical resonator may confine the pumping wavelength $\lambda p$.

In some examples, the laser crystal includes an input facet coated with a first coating that is a high transmission coating at the pumping wavelength $\lambda o$ a high reflective coating at the lasing wavelength $\lambda p$, and an output facet coated with a second coating that is an anti-reflective coating at the lasing wavelength $\lambda p$.

In some examples, the nonlinear crystal is an orientation patterned semiconductor for forward optical parametric oscillation.

In some examples, the nonlinear crystal includes an input facet coated with a third coating that is an anti-reflective coating at the lasing wavelength $\lambda p$, an anti-reflection coating at the signal wavelength $\lambda s$, a high reflection at the idler wavelength $\lambda i$; and an output facet coated with a fourth coating that is a high reflective coating at the lasing wavelength $\lambda p$, and a high reflection coating at signal wavelength $\lambda s$, and an anti-reflection or high transmittance coating at the idler wavelength $\lambda i$.

In some examples, the dichroic mirror has nearly zero loss at the lasing wavelength $\lambda p$ and high reflection at the idler wavelength $\lambda i$.

In some examples, the narrow bandwidth optical filter has nearly zero loss at the signal wavelength $\lambda s$ and high rejection at the lasing wavelength $\lambda p$ and the idler wavelength $\lambda i$.

In some examples, the mirror has high reflection at the signal wavelength $\lambda s$.

In some examples, the second optical resonator further comprises a high speed optical modulator.

In some examples, a laser further comprises two electrodes mounted to the nonlinear crystal.

According to some aspects there is provided a method of tuning the idler wavelength $\lambda i$, comprising generating the pumping wavelength $\lambda o$ using the laser; and applying a voltage to the nonlinear crystal using the two electrodes.

According to some aspects there is provided a method of tuning the idler wavelength $\lambda i$, comprising generating the pumping wavelength $\lambda o$ using the laser; and applying a current through the nonlinear crystal using the two electrodes.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 3 is a schematic diagram of third laser;

FIG. 6 is a chart illustrating a simulation of the output signal and idler wavelengths achievable from an orientation patterned gallium phosphide crystal with different periods at 25° C.;

FIG. 9 is a schematic diagram of a fifth laser; and

DETAILED DESCRIPTION

Figure 1:
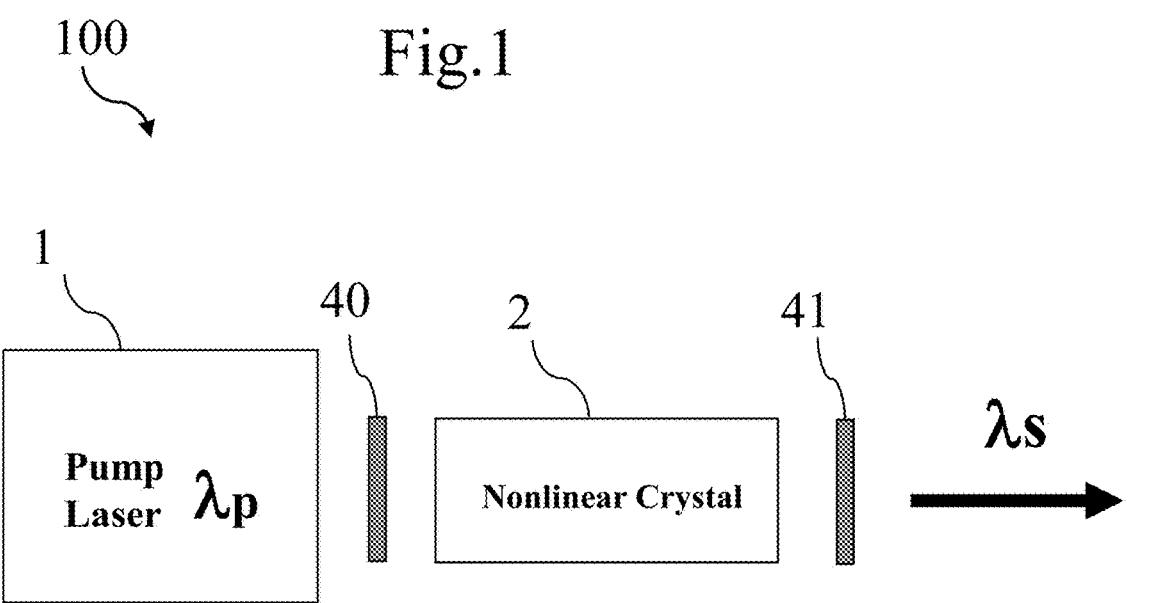
FIG. 1 is a schematic diagram of a first laser.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

The various embodiments described herein generally relate to MWIR and LWIR light generation using backwards and/or forward optical parametric oscillation. In some embodiments, a compact and high-power laser is provided operating in the mid wave infrared that has a narrow emission linewidth to be used in gas detection and free-space optical communication applications.

In some embodiments, backwards/mirrorless optical parametric generation (BOPO) and forward optical parametric generation (FOPO) are used to create a laser. In some embodiments, the laser is capable of emitting in mid wave infrared (MWIR) and long wave infrared (LWIR) wavelength ranges with narrow linewidth, such as for use in gas sensing, light detection and ranging (LiDAR) and optical satellite communication.

In some embodiments, a dual intracavity optical parametric oscillator is presented that will allow for watt-level powers in the MWIR while simultaneously achieving a narrow emission linewidth.

Some embodiments provide a laser operating in the MWIR and LWIR wavelength range using a nonlinear optics based intracavity design. In some embodiments, a compact design, high output power, and a narrow emission spectrum is provided. The laser may be used for various applications including gas absorption spectroscopy and free-space optical communication. In some embodiments, this is achieved through the use of an orientation patterned semiconductor designed for backwards and/or forward optical parametric generation. This allows for the use of one input laser to generate two output wavelengths, the shorter wavelength termed signal and the longer wavelength termed idler. The proposed laser is capable of generating tunable light across the entire near-, mid- and long wave infrared spectrum (1.064-10 microns). The backwards three wave mixing structure can provide high conversion efficiency, at the cost of requiring much smaller nonlinear coefficient inversion periods in the orientation patterned semiconductor versus those typically found in nonlinear photonic crystals. Through the use of orientation patterned semiconductors coupled with electron beam lithography and etching techniques, nonlinear coefficient inversion periods sufficiently small for efficient backwards three wave mixing (on the order of microns or sub-microns) can be achieved.

The laser may be used in various applications, such as where high power, narrow linewidth mid infrared light is required (e.g., gas spectroscopy or LiDAR or free-space optical communication). In some embodiments, the laser includes or consists of a pumping laser diode, a laser cavity including a dichroic mirror, an orientation patterned semiconductor and focusing and collimating elements for the backwards optical parametric oscillation.

In some embodiments, a laser operates in the mid wave infrared wavelength range using a nonlinear optics based on the forwards optical parametric oscillation with a dual intracavity design. This may provide high power and a narrow emission spectrum through the use of a suitable nonlinear material designed for forwards optical parametric oscillation (FOPO). Due to the use of forwards three wave mixing, the number of suitable materials is larger than in the backwards case previously described, due to the larger periods required.

The proposed laser based on the forwards optical parametric oscillation includes or consists of a pump laser diode, a laser cavity consisting of a dichroic mirror, a laser crystal, a nonlinear optics crystal, an optical resonator, a wavelength selective element, an optical modulator, and focusing and collimating elements.

Referring to FIG. 1, an exemplary singly resonant optical parametric oscillator 100 is illustrated. The oscillator 100 includes a pump laser 1 and a non-linear crystal 2 and a laser crystal 4.

The signal wavelength $\lambda_s$ produced by the pump laser 1 is confined by high reflection (HR) coatings 40, 41. The nonlinear crystal 2 is placed within the resonator, increasing the efficiency of the device due to the high confinement of the signal power.

Figure 2:
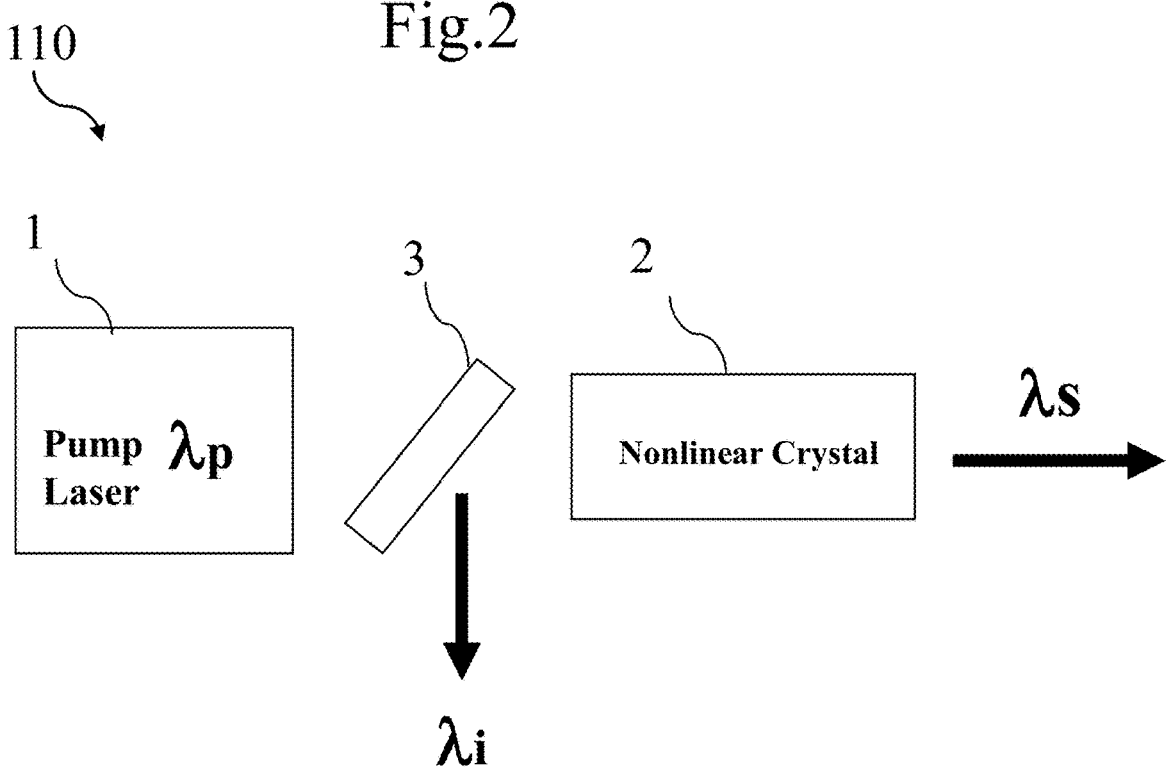
FIG. 2 is a schematic diagram of a second laser.

Referring to FIG. 2, an exemplary backwards optical parametric oscillator 110 is illustrated. The oscillator 110 includes a pump laser 1, a dichroic mirror 3, and a nonlinear crystal 2. The idler wavelength, denoted $\lambda_i$, is shown propagating in an opposite direction from the generated signal wavelength, denoted $\lambda_s$. The dichroic mirror is used to extract the idler beam from the laser while being transparent to the pump beam, denoted $\lambda_p$.

Referring now to FIGS. 3-11, illustrated are embodiments of lasers. In some embodiments, the lasers provide a MWIR and/or LWIR light output with a spectral linewidth on the order of tens of picometers.

Figure 3:
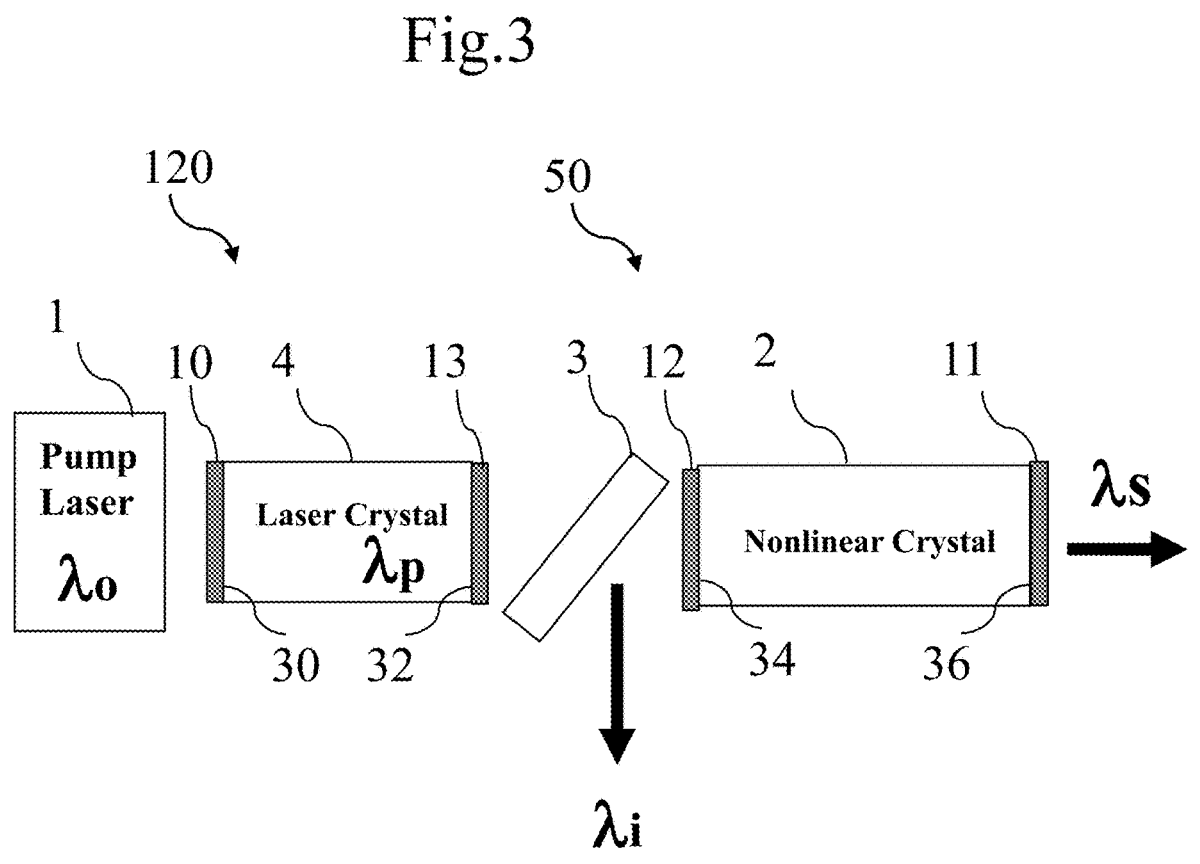

Referring to FIG. 3, illustrated is an exemplary laser 120. The laser 120 is a backwards optical parametric oscillator. The laser 120 may be capable of generating light throughout the mid wave infrared and long wave infrared region. The laser 120 includes a pump laser diode 1 which generates $\lambda_o$ light (e.g., 808 nm) input wavelength for the laser crystal 4, generating pumping wavelength light $\lambda_p$ (e.g., 1064 nm) for the nonlinear crystal 2. The laser 120 may include or consist of a pump laser with a fast axis collimator 1. The nonlinear crystal 2 may include or consist of an orientation patterned semiconductor. An orientation patterned semiconductor may have a period of $\Lambda$ and refractive index np, ns, ni at corresponding wavelength, satisfying the quasi-phase matched condition $1/\Lambda=np/\lambda p-ns/\lambda s+ni/\lambda i$ required for backward optical parametric oscillation $1/\lambda p=1/\lambda s+1/\lambda i$.

The laser 120 also includes a dichroic mirror 3. The idler wavelength, denoted $\lambda_i$, is shown propagating in the opposite direction of the generated signal wavelength, denoted $\lambda_s$. The dichroic mirror is used to extract the idler beam from the laser while being transparent to the pump beam. In some embodiments, the dichroic mirror is selected to have a nearly zero loss at the pumping wavelength $\lambda_p$ and a high reflection at the idler wavelength $\lambda_i$.

As shown in FIG. 3, a laser crystal 4 is used between the pump laser 1 and the nonlinear crystal 2. The laser crystal 4 is pumped by the pump laser diode 1 at $\lambda_0$ which causes stimulated emission to occur within the laser crystal 4, resulting in emission at a lasing wavelength $\lambda_p$. $\lambda_o$ and $\lambda_p$ are dependent on the laser crystal 4 used and on the nonlinear crystal 2. In some examples, the pump laser diode 1 is an 808 nm laser diode, which has a $\lambda_o$ of 808 nm. In some examples, the laser crystal 4 material is Nd:YVO$_4$ which has an emission wavelength of 1064 nm. In some embodiments, a wavelength longer than 1000 nm is used for pumping the nonlinear crystal 2, such as when the non-linear crystal 2 includes a material selected from those for which pumping wavelengths below 1000 nm results in multi-photon absorption effects resulting in a drastic reduction in efficiency (e.g., the nonlinear crystal 2 may include an orientation patterned semiconductor, such as orientation patterned gallium phosphide).

High reflection (HR) and antireflection (AR) coatings have been added to the laser crystal 4 and to the nonlinear crystal 2. As exemplified in FIG. 3, coatings 10, 13 are applied to the surfaces of the laser crystal 4 (i.e., to the input facet 30 and output facet 32, respectively), and coatings 11, 12 applied to the surfaces of the nonlinear crystal 2 (i.e., to the input facet 34 and the output facet 36, respectively). As will be described herein, the coatings 10, 11, 12, and 13 may be designed with various reflective and transmissive properties, depending on the applied use.

In the embodiment of FIG. 3, coating 10 has HR at the pumping wavelength $\lambda_p$ (e.g., 1064 nm) and high transmission (HT) at wavelength $\lambda_o$ (e.g., 808 nm), while coating 11 is HR at the pumping wavelength $\lambda_p$. The purpose of the coatings 10, 11, so designed, is to create an optical resonator 50 to confine the pump wavelength $\lambda_p$. Confining the light will increase the intensity and allow the intensity of the pump wavelength to build to a high enough level to reach the threshold of the BOPO or FOPO process. In the embodiment of FIG. 3, coatings 12, 13 are anti-reflection (AR) coatings at the pumping wavelength $\lambda_p$ to prevent losses due to reflections at the laser crystal 4 surface and the nonlinear crystal 2 surface. The coatings 12, 13, so designed, are for the pump wavelength $\lambda_p$ as small losses during each cavity trip will drastically reduce the circulating intracavity power, resulting in a drastic reduction in efficiency.

The 1064 nm light generated from the laser crystal 4 is pumped into the nonlinear crystal 2 (e.g., the orientation patterned semiconductor) where it is converted into idler light $\lambda_p$ (e.g., 3400 nm idler light) and signal light $\lambda_s$ (e.g., 1548 nm signal light), e.g., through the BOPO or FOPO process. In some embodiments, the nonlinear crystal 2 includes or consists of orientation patterned gallium phosphide. The generated idler light $\lambda_i$ (e.g., 3400 nm light) travels in the opposite direction to the generated signal light $\lambda_s$ (e.g., 1548 nm light) and the pumping light $\lambda_p$ (e.g., 1064 nm light), resulting in it travelling back into the device. To extract the idler light $\lambda_i$ (e.g., 3400 nm light), a dichroic mirror 3 is placed between the nonlinear crystal 2 and the pump laser 1. The dichroic mirror 3 has a high reflectance at the idler wavelength $\lambda_i$ (e.g., 3400 nm light) and high transmission at the pump wavelength $\lambda_p$ (e.g., 1064 nm light), allowing for efficient extraction of the mid infrared wavelength. In some embodiments, the signal light $\lambda_s$ (e.g., 1548 nm light) and the pumping light $\lambda_p$ (e.g., 1064 nm light) that exit the resonator and/or nonlinear crystal 2 are not used. It will be appreciated that the wavelengths of light generated by the nonlinear crystal 2 are not fixed to the values mentioned above and may be tuned to whatever suitable wavelengths are required for the desired application.

In some embodiments, the generated wavelengths can be determined by the conservation of energy and the momentum mismatch. In terms of the conservation of energy, it is required that the signal and idler photon energies add to the energy of the pump photon, $E_{pump}=E_{signal}+E_{idler}$. Since there are infinitely many combinations of signal and idler energies that can satisfy the above condition, the momentum of the system must be analyzed through the wavevectors of each photon. There will be a momentum mismatch between the 3 photons determined by the equation: $\Delta k=k_{pump}-k_{signal}+k_{idler}$, where k is the wavevector of the respective photon. To account for the nonzero momentum mismatch the nonlinear crystal is orientation patterned, which will make the momentum mismatch equal to zero for one pair of signal and idler photon energies. The momentum provided by the patterned structure is given by $$k_{medium} = \frac{2\pi m}{\Lambda},$$

where m is an integer representing the phase matching order (generally first order, m=1 is used for efficient BOPO) and $\Lambda$ is the orientation pattern period. These energies correspond to the center wavelength of the respective emission. Modifying the temperature of the nonlinear crystal changes the period of nonlinear coefficient inversion and thus changes generated signal and idler wavelengths by changing the contribution to the momentum mismatch by the orientation patterned crystal, allowing the laser emission wavelengths to be tuned. The generated beams must be within the transparency window of the nonlinear crystal, which in the case of gallium phosphide is 1-10 microns.

It will be appreciated that, while some embodiments of BOPO or FOPO structures are presented as generating MWIR and LWIR, in some embodiments the OPO structures described herein may be used to produce light of other wavelength bands. A limiting factor to the output wavelength produced is the transparency window of the nonlinear crystal 2 selected. Other crystals such as periodically poled lithium niobate (PPLN), periodically poled potassium titanyl phosphate (PPKTP), periodically poled lithium tantalate (PPLT), and more have transparency regions that cover the visible and short-wave infrared as well. For example, lithium niobate has a transparency window of 0.4-5 microns, and as such can be used to generate visible, SWIR, and MWIR light if used in the nonlinear crystal 2. If a suitable crystal 2 is selected, the limits on output wavelength may be driven by the selection of pump laser 1 and the tuning limit of the method selection for nonlinear inversion period tuning, e.g., through the use of the electro optic effect or the thermo optic effect.

Figures 4, 5:
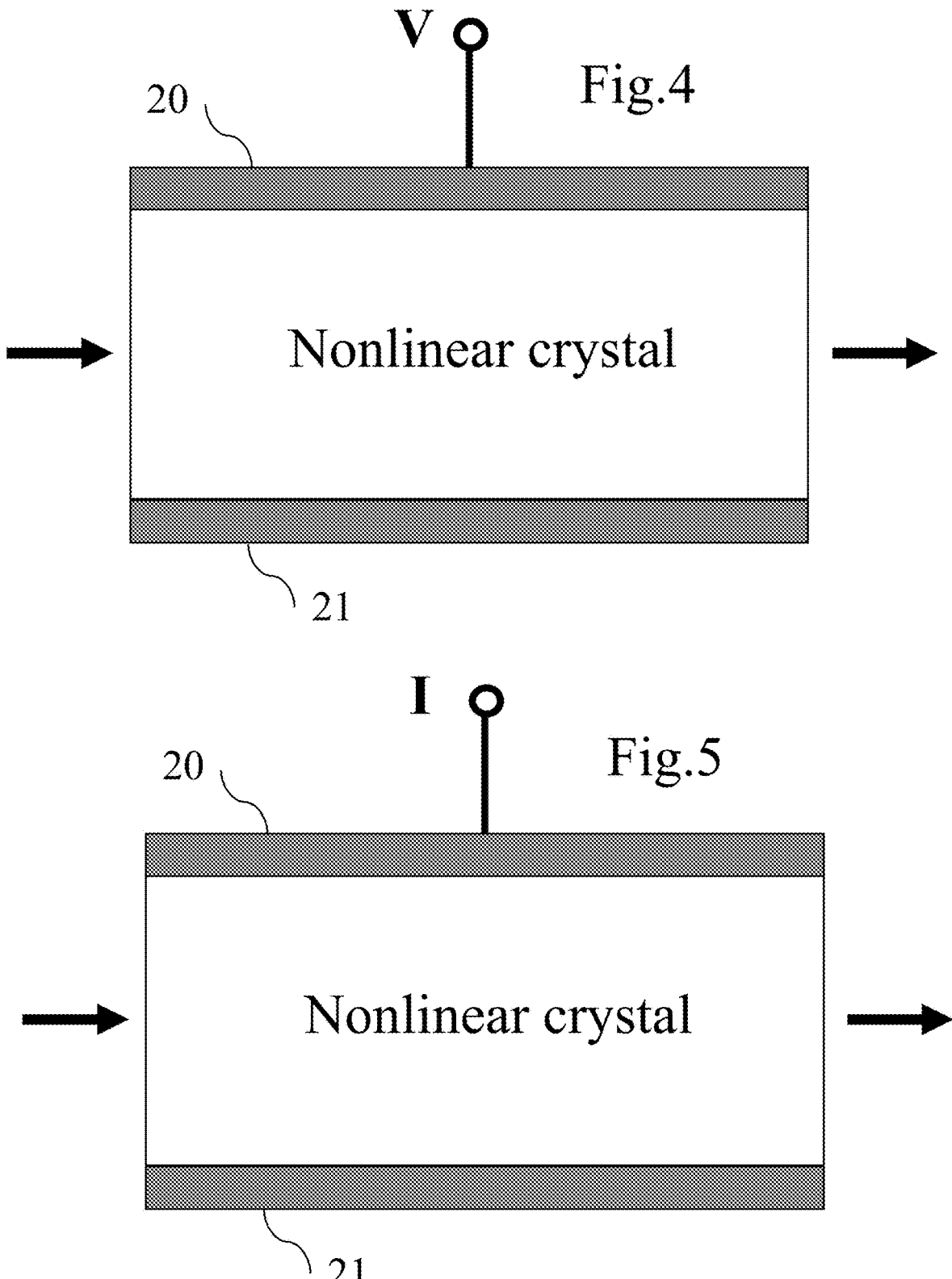
FIG. 4 is a schematic diagram of a nonlinear crystal with electrodes mounted to the crystal and a potential difference applied across the electrodes.
FIG. 5 is a schematic diagram of a nonlinear crystal with electrodes mounted to the crystal and a current applied through the electrodes.
Figure 7:
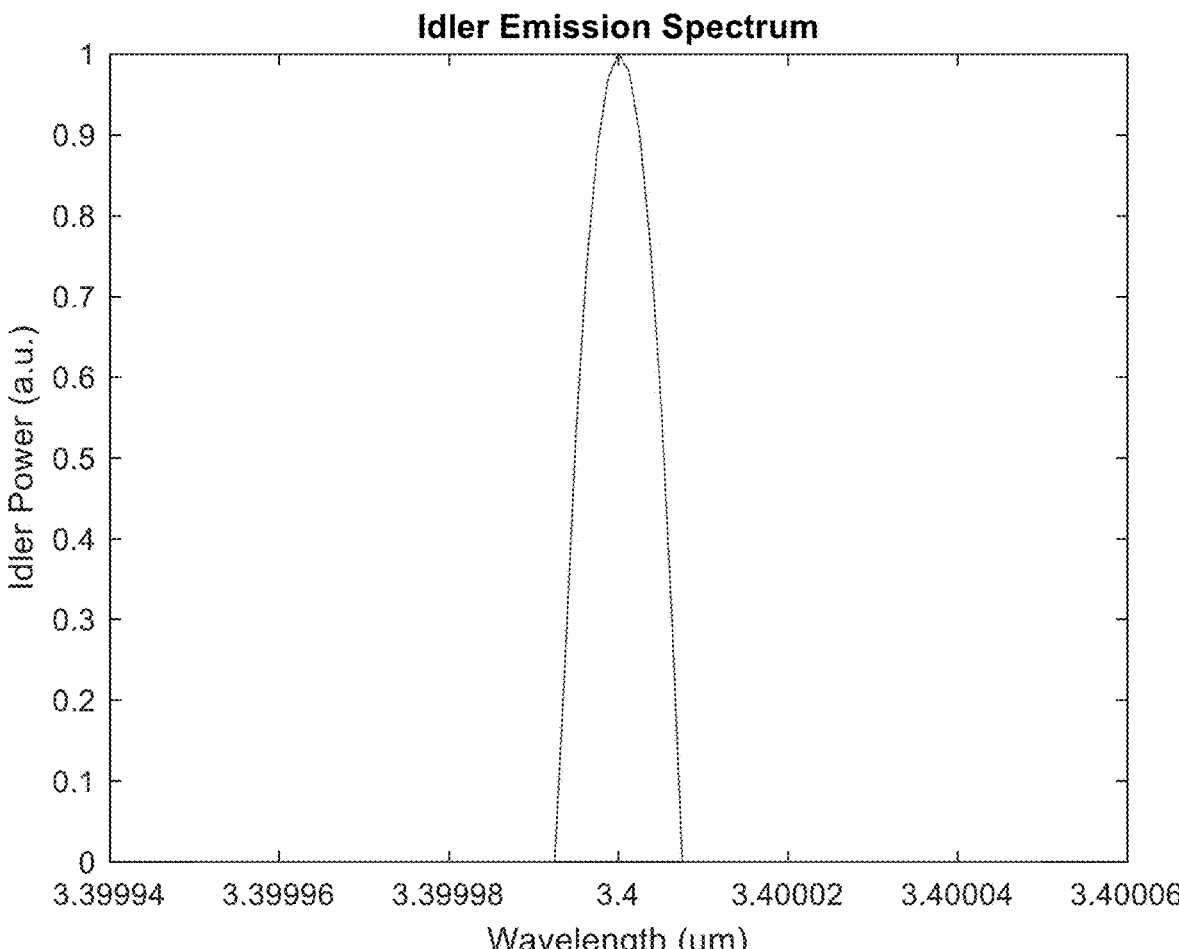
FIG. 7 is a chart illustrating a simulation of the idler wave spectrum of the laser of FIG. 3, with a center wavelength of 3400 nm and a full width half maximum of the emission spectrum of 27 pm.

Referring now to FIG. 4, in some embodiments the period and/or phase matching condition of the nonlinear crystal 2 (and thus the idler mid-IR wavelength) can be controlled via a potential difference across electrodes 20, 21 to take advantage of the electro-optic effect. As exampled, the electrodes 20, 21 are arranged on opposite sides of the nonlinear crystal 2. The electrodes 20, 21 are arranged across from one another with a path between the input and output ends of the nonlinear crystal 2 extending between the electrodes 20, 21.

According to some aspects there is provided a method of tuning the idler wavelength $\lambda i$ and signal wavelength $\lambda s$ with a fixed pumping wavelength $\lambda p$ through the backward or forward optical parametric oscillation process, by applying a voltage to the nonlinear crystal using the two electrodes to change the phase matching conditions and thus generated idler wavelength $\lambda i$ and signal wavelength $\lambda s$.

Referring now to FIG. 5, in some embodiments the period and/or phase matching condition of the nonlinear crystal 2 (and thus the idler mid-IR wavelength) can be controlled via heating the nonlinear crystal 2. This uses the thermo-optic effect to modify the period of the nonlinear crystal 2. For example, the nonlinear crystal 2 may be heated by applying an electric current through electrodes mounted to the crystal 2, such as electrodes 20, 21.

According to some aspects there is provided a method of tuning the idler wavelength $\lambda i$ and signal wavelength $\lambda s$ with a fixed pumping wavelength $\lambda p$ through the backward or forward optical parametric oscillation process, by applying a current through the nonlinear crystal using the two electrodes to change the phase matching conditions and thus generated idler wavelength $\lambda i$ and signal wavelength $\lambda s$.

It will further be appreciated that while the nonlinear crystal 2 may include or consist of orientation patterned semiconductors due to their wide transmission windows in the MWIR and LWIR, in some embodiments a laser (e.g., laser 120) does not require orientation patterned semiconductors. In some embodiments, another nonlinear crystal can be utilized. In some embodiments, a main limitation is the practical poling period attainable via manufacturing processes for BOPO designs and/or FOPO designs. This is less of an issue for FOPO designs where the required period is much larger than that of the BOPO structure, and larger periods may be significantly easier to manufacture. For example, the nonlinear crystal 2 may include or consist of one or more of KH2PO4 (KDP), LiB3O5 (LBO), β-BaB2O4 (BBO), KTiOPO4 (KTP), and LiNbO3 (LN). In some examples, any material with a sufficiently high nonlinear coefficient and some method of achieving nonlinear domain inversion may be used in the nonlinear crystal. Due to the ability to utilize various nonlinear crystals, the laser structure can be tailored to a wide variety of applications and environmental operation conditions.

The pump wavelength, $\lambda_p$, can vary depending on the laser crystal used. In some embodiments, the laser 120 includes a laser crystal 4 that is a Nd:YVO4 crystal with 1064 nm emission. The signal wavelength, $\lambda s$, and idler wavelength, $\lambda i$, can vary depending on which wavelengths satisfy the conditions discussed above. In some embodiments, the pump wavelength is 1064 nm, the signal wavelength 1548 nm and the idler wavelength is 3400 nm (see, e.g., FIG. 7).

Figure 6:
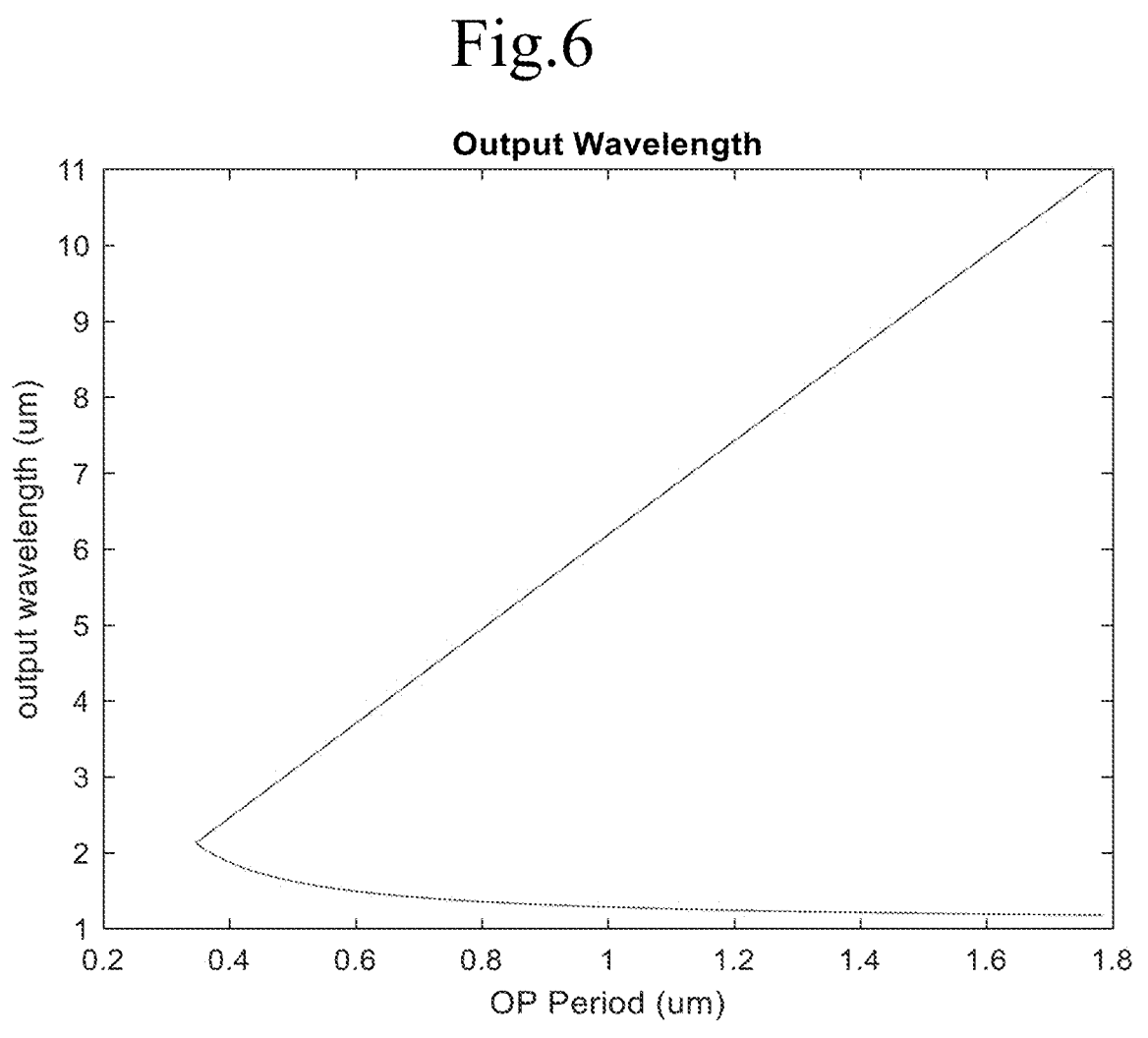

Referring now to FIG. 6, where the nonlinear crystal 2 is gallium phosphide nonlinear crystal for MWIR generation based on BOPO, a period around 1 micron is necessary, which is achievable by using a photolithography process.

In some embodiments, the described intracavity design may be able to achieve narrow linewidth using a low-cost pump laser diode 1. With only a few watts of input power from the 808 nm laser diode, we can see from FIG. 7 that linewidth of the generated MWIR light as narrow as 27 pm may be achievable by using the laser 120 exemplified in FIG. 3.

Figure 8:
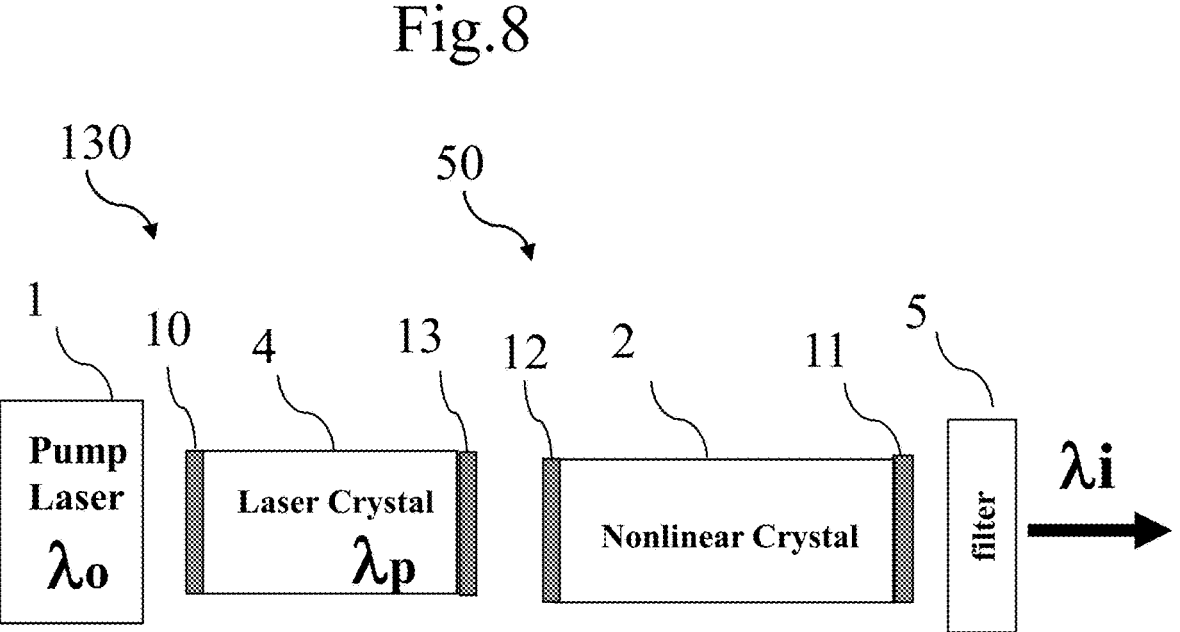
FIG. 8 is a schematic diagram of a fourth laser.

Referring now to FIG. 8, illustrated is another embodiment of a laser 130. Laser 130 also includes a BOPO intracavity structure. However, in some embodiments laser 130 does not include a dichroic mirror. In the embodiment of FIG. 8, the coating 12 of laser 130 is AR at the pump wavelength $\lambda p$ and HR at the idler wavelength $\lambda i$. In some embodiments, this significantly improves the output idler power due to utilizing both the forward and backward pump waves within the cavity formed by coatings 10 and 11, which may be HR at the pumping wavelength. In the intracavity structures, there may be two sets of waves: the forward (which in reference to FIG. 8 would be travelling from 10 to 11) and the backward (travelling from 11 to 10). The forward and backward pump waves may each generate a signal and idler wave. Adding a reflective component to the nonlinear crystal at 12 for the idler travelling in the backward direction may prevent or reduce the loss of the idler (e.g., which would otherwise be lost either due to absorption in the laser crystal 4 or lost out of the cavity mirror 10). By adding an HR coating for coating 12, the generated idler power in the backward direction is redirected out of the output coupling mirror 11 along with the forward power. In some embodiments, this may lead to up to 4 times higher idler output power (e.g., depending on nonlinear crystal length, and thus the phase difference between the forwards and backwards propagating idler waves). In some embodiments, the dichroic mirror is replaced with a reflective coating at coating 12 to reflect the idler wavelength, to provide a gain in output power of the idler wavelength. A filter 5 has been added at the output of the BOPO to remove light at the pump and signal wavelengths. The optical filter 5 may have nearly zero loss at the idler wavelength $\lambda i$ and high rejection at the lasing wavelength $\lambda p$ and a signal wavelength $\lambda_s$. The nonlinear crystal 2 may be an orientation patterned semiconductor with a period of A and refractive index np, ns, ni at corresponding wavelength, satisfying the quasi-phase matched condition $1/\Lambda = np/\lambda p - ns/\lambda s + ni/\lambda i$ required for backward optical parametric oscillation $1/\lambda p = 1/\lambda s + 1/\lambda i$.

Figure 9:
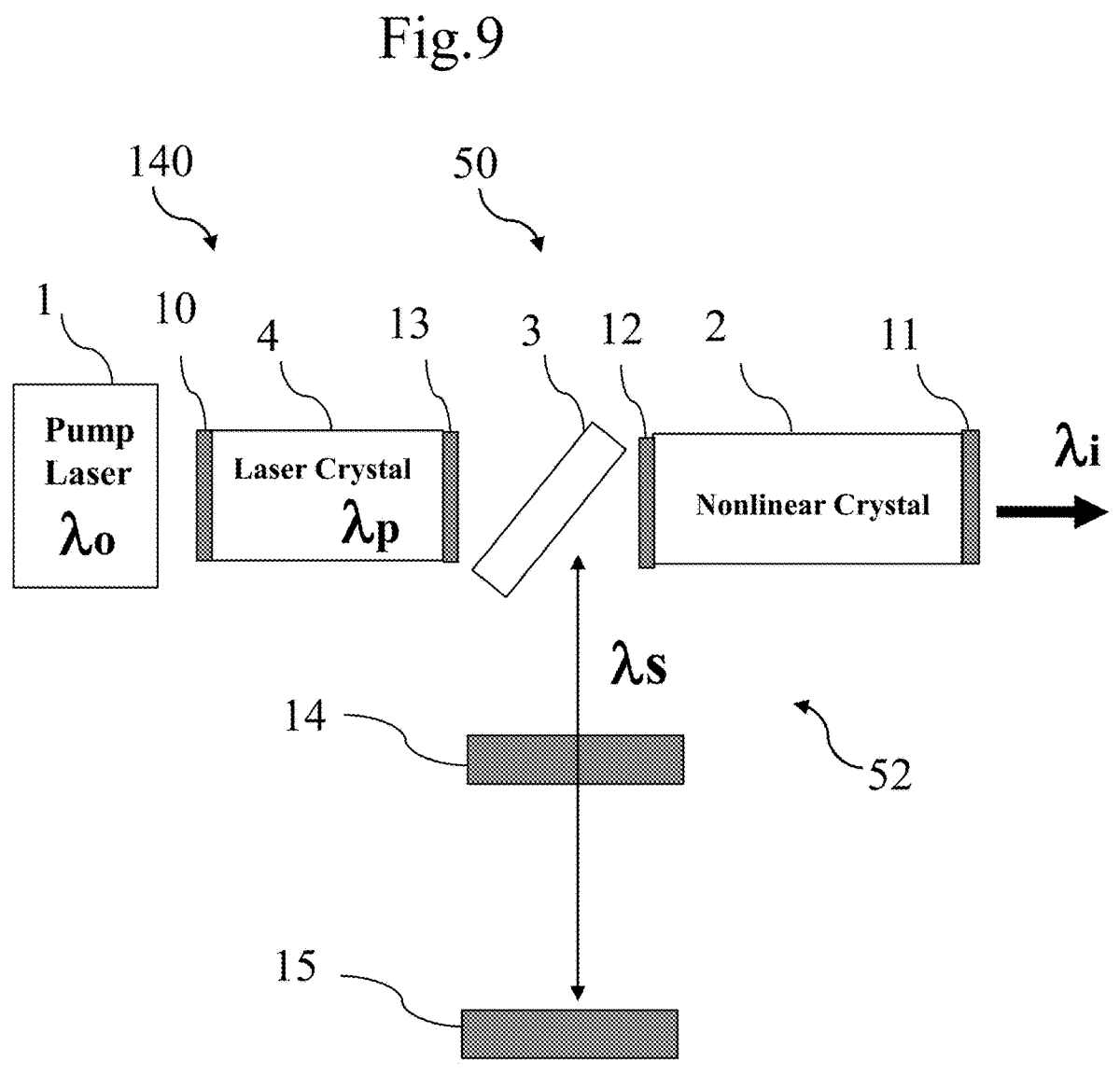

Referring now to FIG. 9, illustrated is another embodiment of a laser 140. In some embodiments, the laser 140 is a dual cavity seeded FOPO design. The laser 140 has two optical resonators, one for the pump and one for the signal wavelength. The pump wavelength is confined between the HR coatings at coatings 10 and 11, while the signal wavelength is confined between the mirror 15 and the HR coating at coating 11. In some embodiments, a wavelength selective element such as a bandpass filter or etalon 14 is inserted into the cavity.

The laser 140 is similar in some respects to the laser 120 of FIG. 3. Coating 10 may be HR at the pumping wavelength $\lambda_p$ (e.g., 1064 nm) and high transmission (HT) at wavelength $\lambda_o$ (e.g., 808 nm), while coating 11 may be HR at both the pumping wavelength $\lambda_p$ and the signal wavelength $\lambda_s$. Coatings 12, 13 may be anti-reflection (AR) coatings at the pumping wavelength $\lambda_p$ to prevent losses due to reflections at the laser crystal 4 surface and the nonlinear crystal 2 surface. A coating on a mirror 15 is HR at the signal wavelength $\lambda_s$. Since mid-IR generation is based on the FOPO here, period of the nonlinear crystal is larger than that used in the BOPO. The dichroic mirror 3 may have nearly zero loss at the lasing wavelength $\lambda_p$ and high reflection at the signal wavelength $\lambda_s$. The laser 140 may include a reflective coating at coating 12 to reflect the idler wavelength.

In the FOPO, the generated wavelengths can also be determined by the conservation of energy and the momentum mismatch. In terms of the conservation of energy, the signal and idler photon energies add to the energy of the pump photon, $E_{pump}=E_{signal}-E_{idler}$. Since there are infinitely many combinations of signal and idler energies that can satisfy the above condition, the momentum of the system must be analyzed through the wavevectors of each photon. Compared with the BOPO, there will be a smaller momentum mismatch between the 3 photons (propagating along the same direction) determined by the equation: $\Delta k=k_{pump}-k_{signal}-k_{idler}$, where k is the wavevector of the respective photon. To account for the nonzero momentum mismatch the nonlinear crystal is orientation patterned, which will make the momentum mismatch equal to zero for one pair of signal and idler photon energies. The momentum provided by the patterned structure is given by $$k_{medium} = \frac{2\pi m}{\Lambda},$$

where m is an integer representing the phase matching order (generally first order, m=1 is used for efficient FOPO) and $\Lambda$ is the orientation pattern period. These energies correspond to the center wavelength of the respective emission. Modifying the temperature of the nonlinear crystal changes the period of nonlinear coefficient inversion and thus changes generated signal and idler wavelengths by changing the contribution to the momentum mismatch by the orientation patterned crystal, allowing the laser emission wavelengths to be tuned. The generated beams must be within the transparency window of the nonlinear crystal, which in the case of gallium phosphide is 1-10 microns.

As a FOPO, the idler is generated along the same propagation direction as the pump and signal wavelengths. There is a cavity for the pump wavelength formed by HR coatings at coatings 10 and 11, however the coating at coating 11 is HR at both the pump wavelength $\lambda$p and the signal wavelength $\lambda$s while the coating at coating 10 is HR at the pump wavelength $\lambda$p and HT at $\lambda$o. The cavity formed by 10 and 11 allows the pump light to resonate in first resonator 50, while a second resonator 52 (i.e., an optical resonator for the signal wave) is formed between an additional mirror 15 with a HR coating and the HR coating at coating 11 (which confines the signal light). The propagating signal light reflects off of the dichroic mirror 3 to prevent any losses in the signal power due to absorption in the gain medium.

Additionally, in some embodiments, a wavelength selective component 14 is inserted into the signal resonator. This could be a Fabry Perot etalon, a bandpass filter, or any other wavelength selective component with narrow linewidth.

Through the addition of this wavelength selective component, the linewidth of the signal is significantly reduced at the cost of some insertion loss. In some embodiments, the insertion loss is accounted for by the increase in circulating power due to the resonance of the signal wavelength within the second resonator. To reduce the insertion loss, the facets of the wavelength selective element can be AR coated at the signal wavelength. In some embodiments, the addition of the wavelength selective element 14 has the additional benefit of ensuring that the output idler wavelength has a significantly reduced linewidth as well. In this way, the typically broad output spectrum of a standard FOPO design is reduced via the addition of a second cavity and a wavelength selective element. In contrast to some other seeded FOPO lasers, laser 140 doesn't need to use a narrow linewidth signal laser to reduce the linewidth of the idler wave and to increase the efficiency of the FOPO process.

In some embodiments, the nonlinear crystal is an orientation patterned semiconductor with a period of A and refractive index np, ns, ni at corresponding wavelength, satisfying the quasi-phase matched condition $1/\Lambda=np/\lambda p-ns/\lambda s-ni/\lambda i$ required for forward optical parametric oscillation $1/\lambda p=1/\lambda s+1/\lambda i$.

Figure 10:
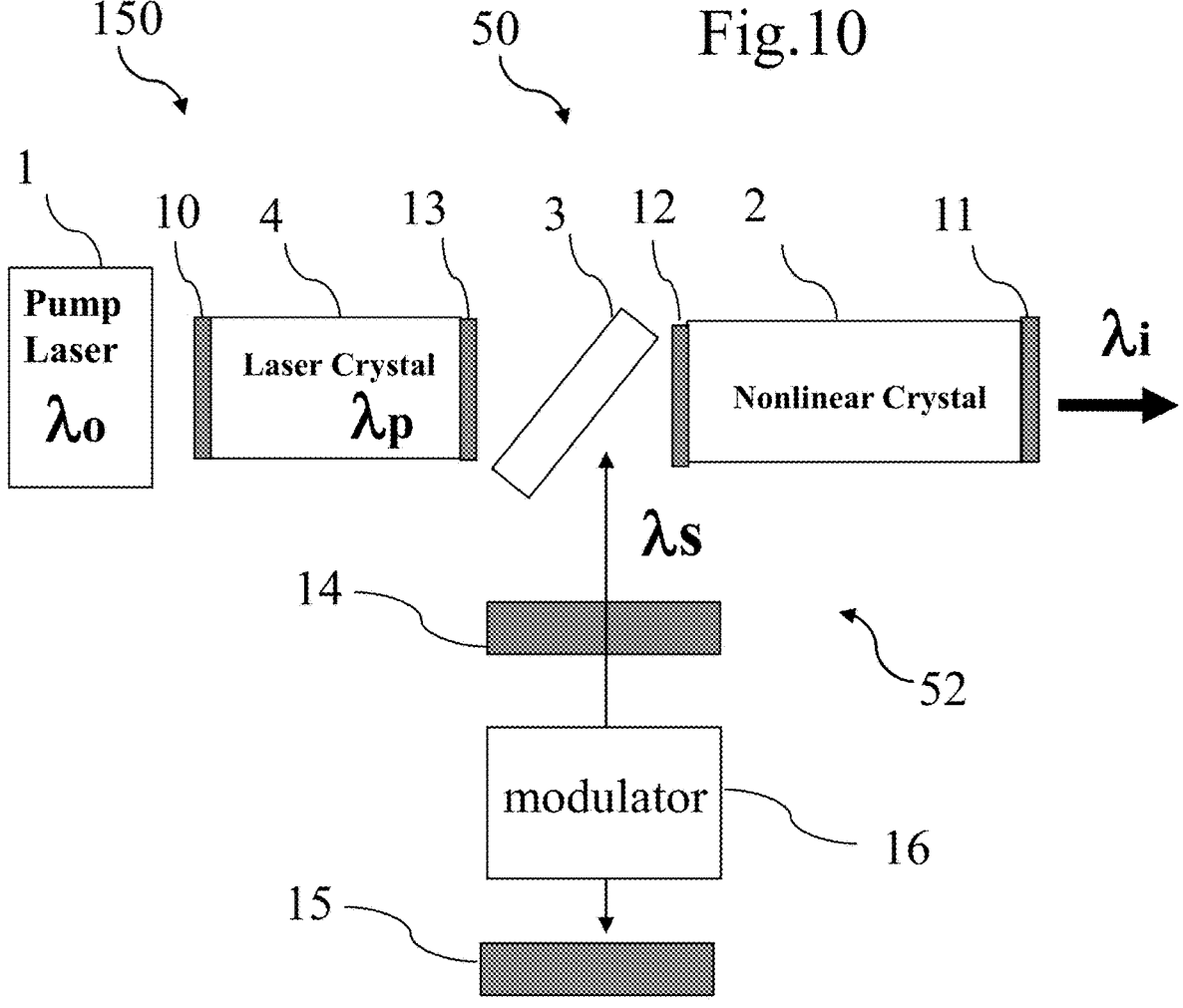
FIG. 10 is a schematic diagram of a sixth laser.

Referring now to FIG. 10, illustrated is another embodiment of a laser 150. Laser 150 is similar in some respects to laser 140. Laser 150 includes a high speed modulator 16 (e.g., an electro-optical modulator) in the signal resonator. In some embodiments, the modulated information is preserved in the generated idler wavelength, creating a high-speed mid-infrared laser with narrow linewidth.

The modulator 16 would be used with a signal laser with wavelength $\lambda$s, or could consist of a high-speed electro-optic modulator capable of gigabit modulation, or with certain diode lasers, a direct modulation approach can be utilized where the input current to the laser is modulated at gigabit speeds. Through the modulation of the signal wavelength, a modulated idler output in the mid-infrared can be achieved. This is due to the near-instantaneous speed of nonlinear optical processes when compared to the time scale of gigabit level modulation, so the only limit on potential modulation speed is the modulation bandwidth of the modulator or seed laser. This design is potentially suitable for free space optical communications in the mid-infrared, where atmospheric effects are significantly mitigated via the use of mid- and long-infrared wavelengths when compared to the short-wave infrared.

The invention claimed is:

1. A narrow linewidth mid infrared laser, comprising:
   a. a pumping laser diode with a fast-axis compressor and configured to generate a lasing light at a lasing wavelength $\lambda_o$; and
   b. an optical resonator arranged to receive the lasing light at the pumping lasing wavelength $\lambda_o$, the optical resonator including a laser crystal that is configured to receive the lasing light and to generate a pumping light at a pumping wavelength $\lambda_p$, a dichroic mirror, and a nonlinear crystal configured to receive the pumping light and to generate an idler light at an idler wavelength $\lambda_i$ and to generate a signal light at a signaling wavelength $\lambda_s$, wherein the idler light travels in an opposite direction to the signal light and the pumping light;
   wherein the nonlinear crystal is configured with an orientation patterned semiconductor that has a period of $\Lambda$ and a respective refractive index np, ns, ni at corresponding wavelengths, and the period $\Lambda$ is determined based on a quasi-phase matched condition $1/\Lambda=np/$ $\lambda_p$––ns/$\lambda_s$+ni/$\lambda_i$ and an energy conservation condition of backward optical parametric oscillation $1/\lambda_p=1/\lambda_s+1/\lambda_i$.

2. The laser of claim 1, wherein an input facet of the laser crystal is coated with a first coating that is a high transmission coating at the lasing wavelength $\lambda_o$ and a high reflective coating at the pumping wavelength $\lambda_p$; and an output facet of the laser crystal is coated with a second coating that is an anti-reflective coating at the pumping wavelength $\lambda_p$.

3. The laser of claim 1, wherein the dichroic mirror is selected to have a nearly zero loss at the pumping wavelength $\lambda_p$ and a high reflection at the idler wavelength $\lambda_i$.

4. The laser of claim 1, wherein the nonlinear crystal includes an input facet coated with a third coating that is an anti-reflective coating at the pumping wavelength $\lambda_p$ and a high transmission coating at the idler wavelength $\lambda_i$; and an output facet coated with a fourth coating that is a high reflective coating at the pumping wavelength $\lambda_p$.

5. The laser of claim 1, further comprising two electrodes mounted to the nonlinear crystal.

6. A method of tuning the idler wavelength $\lambda_i$, comprising generating the pumping wavelength $\lambda_p$ using the laser of claim 5; and applying a voltage to the nonlinear crystal using the two electrodes.

7. A method of tuning the idler wavelength $\lambda_i$, comprising generating the pumping wavelength $\lambda_p$ using the laser of claim 5; and applying a current through the nonlinear crystal using the two electrodes.

8. A narrow linewidth mid infrared laser, comprising:
a. a pumping laser diode with a fast-axis compressor and configured to generate a lasing light at a lasing wavelength $\lambda_o$; and
b. an optical resonator arranged to receive the lasing light at the lasing wavelength $\lambda_o$, the optical resonator including a laser crystal that is configured to receive the lasing light and to generate a pumping light at a pumping wavelength $\lambda_p$, and a nonlinear crystal configured to receive the pumping light and to generate an idler light at an idler wavelength $\lambda_i$ and to generate a signal light at a signaling wavelength $\lambda_s$, wherein the idler light travels in an opposite direction to the signal light and the pumping light;
wherein the nonlinear crystal is configured with an orientation patterned semiconductor that has a period of $\Lambda$ and a respective refractive index np, ns, ni at corresponding wavelengths, and the period $\Lambda$ is determined based on a quasi-phase matched condition $1/\Lambda=np/\lambda_p-ns/\lambda_s+ni/\lambda_i$ and an energy conservation condition of backward optical parametric oscillation $1/\lambda_p=1/\lambda_s+1/\lambda_i$; and
c. an optical filter arranged to receive the idler light at the idler wavelength $\lambda_i$ from an outlet facet of the nonlinear crystal.

9. The laser of claim 8, wherein an input facet of the laser crystal is coated with a first coating that is a high transmission coating at the lasing wavelength $\lambda_o$ and a high reflective coating at the pumping wavelength $\lambda_p$; and an output facet of the laser crystal is coated with a second coating that is an anti-reflective coating at the pumping wavelength $\lambda_p$.

10. The laser of claim 8, wherein the nonlinear crystal includes an input facet coated with a third coating that is an anti-reflective coating at the pumping wavelength $\lambda_p$ and a high transmission coating at the idler wavelength $\lambda_i$; and an output facet coated with a fourth coating that is a high reflective coating at the pumping wavelength $\lambda_p$ and an anti-reflective or high transmittance coating at the idler wavelength $\lambda_i$.

11. The laser of claim 8, wherein the optical filter has nearly zero loss at the idler wavelength $\lambda_i$ and high rejection at the pumping wavelength $\lambda_p$ and a signal wavelength $\lambda_s$ that is also generated by the nonlinear crystal.

12. The laser of claim 8, further comprising two electrodes mounted to the nonlinear crystal.

13. A method of tuning the idler wavelength $\lambda_i$, comprising generating the pumping wavelength $\lambda_p$ using the laser of claim 12; and applying a voltage to the nonlinear crystal using the two electrodes.

14. A method of tuning the idler wavelength $\lambda_i$, comprising generating the pumping wavelength $\lambda_p$ using the laser of claim 12; and applying a current through the nonlinear crystal using the two electrodes.

15. A high power mid infrared laser, comprising:
a. a pumping laser diode with a fast-axis compressor and configured to generate a lasing light at a lasing wavelength $\lambda_o$; and
b. a first optical resonator arranged to receive the lasing light at the lasing wavelength $\lambda_o$, the first optical resonator including a laser crystal that is configured to receive the lasing light and to generate a pumping light at a lasing pumping wavelength $\lambda_p$, a dichroic mirror, and a nonlinear crystal configured to receive the pumping light and to generate an idler light at an idler at an idler wavelength $\lambda_i$ and a signal light at a signal wavelength $\lambda_s$, wherein the idler light travels in an opposite direction to the signal light and the pumping light;
wherein the nonlinear crystal is configured with an orientation patterned semiconductor that has a period of $\Lambda$ and a respective refractive index np, ns, ni at corresponding wavelengths, and the period $\Lambda$ is determined based on a quasi-phase matched condition $1/\Lambda=np/\lambda_p-ns/\lambda_s-ni/\lambda_i$ and an energy conservation condition of forward optical parametric oscillation $1/\lambda_p=1/\lambda_s+1/\lambda_i$; and
c. a second optical resonator arranged to confine the signal light at the signal wavelength $\lambda_s$, the second optical resonator including a second mirror, a narrow bandwidth optical filter, the dichroic mirror, and the nonlinear crystal.

16. The laser of claim 15, wherein the laser crystal includes an input facet coated with a first coating that is a high transmission coating at the lasing wavelength $\lambda_o$ and a high reflective coating at the pumping wavelength $\lambda_p$, and an output facet coated with a second coating that is an anti-reflective coating at the pumping wavelength $\lambda_p$.

17. The laser of claim 15, wherein the nonlinear crystal includes an input facet coated with a third coating that is an anti-reflective coating at the pumping wavelength $\lambda_p$, an anti-reflection coating at the signal wavelength $\lambda_s$, a high reflection at the idler wavelength $\lambda_i$; and an output facet coated with a fourth coating that is a high reflective coating at the pumping wavelength $\lambda_p$, and a high reflection coating at the signal wavelength $\lambda_s$, and an anti-reflection or high transmittance coating at the idler wavelength $\lambda_i$.

18. The laser of claim 15, wherein the dichroic mirror has nearly zero loss at the pumping wavelength $\lambda_p$ and high reflection at the signal wavelength $\lambda_s$.

19. The laser of claim 15, wherein the narrow bandwidth optical filter has nearly zero loss at the signal wavelength $\lambda_s$ and high rejection at the pumping wavelength $\lambda_p$ and the idler wavelength $\lambda_i$.

20. The laser of claim 15, wherein the second mirror has high reflection at the signal wavelength $\lambda_s$.

21. The laser of claim 15, wherein the second optical resonator further comprises a high speed optical modulator.

22. The laser of claim 15, further comprising two electrodes mounted to the nonlinear crystal.

23. A method of tuning the idler wavelength $\lambda_i$, comprising generating the pumping wavelength $\lambda_p$ using the laser of claim 22; and applying a voltage to the nonlinear crystal using the two electrodes.

24. A method of tuning the idler wavelength $\lambda_i$, comprising generating the pumping wavelength $\lambda_p$ using the laser of claim 22; and applying a current through the nonlinear crystal using the two electrodes.

* * * * *